United States Patent [19]  [11] 4,439,833
Yamaguchi et al.  [45] Mar. 27, 1984

[54] METHOD AND APPARATUS FOR DETECTING THE GEAR POSITION OF TRANSMISSION

[75] Inventors: Hiroshi Yamaguchi; Kenji Ikeura, both of Yokosuka, Japan

[73] Assignee: Nissan Motor Co., Ltd., Yokohama, Japan

[21] Appl. No.: 302,296

[22] Filed: Sep. 14, 1981

[30] Foreign Application Priority Data

Sep. 29, 1980 [JP] Japan ............................... 55-134272

[51] Int. Cl.³ ............................................. G06F 15/20
[52] U.S. Cl. ......................... 364/431.09; 123/198 DB; 123/333; 180/70.1; 180/179; 340/53; 340/62
[58] Field of Search ................. 340/52 D, 53, 62, 681; 180/179, 70.1; 364/431.02, 431.03, 442, 431.05, 431.09; 123/333, 198 DB

[56] References Cited

U.S. PATENT DOCUMENTS

| 4,044,634 | 8/1977 | Florus et al. ......................... 74/866 |
| 4,100,530 | 7/1978 | den Brinker et al. ................. 340/53 |
| 4,107,776 | 8/1978 | Beale ............................... 364/442 X |
| 4,157,030 | 6/1979 | Keely .............................. 364/442 X |
| 4,198,933 | 4/1980 | Sieber et al. ................. 123/198 DB |
| 4,262,557 | 4/1981 | Grob et al. ..................... 180/70.1 X |
| 4,375,207 | 3/1983 | Sieber et al. ................. 123/198 DB |

FOREIGN PATENT DOCUMENTS 1287012 8/1972 United Kingdom .

Primary Examiner—David L. Trafton
Attorney, Agent, or Firm—Schwartz, Jeffery, Schwaab, Mack, Blumenthal & Koch

[57] ABSTRACT

In order to mathematically detect the gear position of a vehicle transmission system, engine speed and vehicle speed are detected. A first reference level defined by a predetermined ratio of engine speed and vehicle speed is established for determining the gear position by a mathematical operation involving the sensed engine speed and the sensed vehicle speed and the reference level. The first reference level is shifted to a second reference level in accordance with the determined gear position, thereby preventing an erroneous determination of the gear position.

16 Claims, 6 Drawing Figures

METHOD AND APPARATUS FOR DETECTING THE GEAR POSITION OF TRANSMISSION

BACKGROUND OF THE INVENTION

1. Field of the Invention

The present invention generally relates to a method and apparatus for detecting the gear position of a transmission for a vehicle having an engine, and more particularly to a microcomputer based method and apparatus for detecting the gear position of a transmission in response to sensed engine speed and vehicle speed.

2. Description of the Prior Art

The gear position of a vehicular transmission system is detected or ascertained and the detected gear position is used as an operating parameter in various kinds of control systems, such as a fuel supply control to an internal combustion engine.

Fuel cut off control systems are currently in use as a part of a fuel supply control for internal combustion engines, wherein the fuel supply is cut off, usually in the top gear position only. The reason for this is that if the fuel supply is interrupted during operation in gear positions other than the top gear, the shock inherent upon entering into the fuel cut off mode is considerable and causes discomfort to the vehicle's occupants.

Therefore, whether the transmission is in fact in top gear should be determined positively so as to eliminate the above-mentioned problem.

In a previously proposed gear position detecting system a plurality of mechanical switches, such as microswitches, are attached to suitable portions of the transmission which are actuated in order to achieve a given gear position, and arranged to produce an electric signal indicative of the selected gear position.

However, this detecting system suffered from the disadvantage that the step of attaching the microswitches to the appropriate portions of the transmission undesirably adds to the number of steps during assembly of the transmission. Furthermore, after long use, the microswitches are apt to malfunction.

In order to eliminate the above mentioned disadvantages, there has been proposed a microcomputer based system for detecting the gear position of a transmission.

The system involves a mathematical operation or process based on sensed engine speed and sensed vehicle speed (which can be represented by the rotational speed of a transmission output shaft).

The operation of the system is set forth hereinafter.

When the vehicle is running, the following relationship pertains:

$$V = \frac{60}{1000} \cdot \frac{N}{G_0 \cdot G_t} \cdot 2\pi r \quad (1)$$

where: V(km/h) represents the vehicle speed, N (rpm) represents the engine speed, $G_t$ represents the transmission gear ratio, $G_0$ represents the final gear ratio, and r (m) represents the effective radius of a tire.

From equation (1), the ratio N/V can be expressed as follows:

$$\frac{N}{V} = \frac{25 G_0 \cdot G_t}{3\pi r} \quad (2)$$

Assuming that the gear ratio $G_t$ of the top gear is 1.0 and the gear ratio of the third gear is 2.0, equation (2) can be expressed as follows:

When the top gear is selected;

$$\frac{N}{V} = \frac{25 G_0}{3\pi r} \quad (3)$$

and when the third gear is selected;

$$\frac{N}{V} = \frac{50 G_0}{3\pi r} \quad (4)$$

In order to mathematically detect the gear position, the engine speed N, for example, is compared with a reference level K obtained by multiplying the vehicle speed V by the mean value k of the above described N/V values associated with each gear position.

In this case, the reference level K is determined to be $$K = V \frac{75 G_0}{6\pi r}.$$

If the engine speed N is lower than the reference value K (N<K), the system determines that the top gear has been selected.

Conversely, if the engine speed is higher than the reference level K (N>K), the system determines that third gear has been selected.

Needless to say, the same result can be obtained by comparing the ratio N/V with a reference level k=75 $G_0/6\pi r$ which corresponds to the mean value of the N/V values as determined by equations (2) and (3) in place of comparing the vehicle speed V with the reference level K.

In the case of a centralized control system using a single microcomputer, however, the system is preferably arranged to operate on a time sharing basis. Therefore, the input data such as the engine speed data and the vehicle speed data are intermittently inputted to the microcomputer.

However, in view of the requirements of the computation of the other control modes such fuel supply control, vehicle speed data is supplied to the microcomputer at longer intervals than the engine speed data.

Therefore, when a rapid change occurs in the vehicle speed, such as the case of an abrupt deceleration, the vehicle speed data read in by the microcomputer may not accurately follow with the actual vehicle speed, and consequently, it is likely that the system make an erroneous determination of the gear position.

SUMMARY OF THE INVENTION

The present invention provides a gear position detecting system which is capable of producing an accurate gear position signal even under conditions where the sensed engine speed or vehicle speed changes abruptly.

According to the present invention, an apparatus for detecting the gear position of a transmission system of a vehicle having an engine, a manually operable gear selector, and an accelerator pedal, comprises:

means for sensing the engine speed N;
means for sensing the vehicle speed V,
the vehicle having a first characteristic N/V ratio corresponding to a first gear position of the transmission system and second characteristic N/V ratio corresponding to second gear position of the transmission system;

means for establishing a first reference level defined by a first predetermined ratio value of the engine speed and the vehicle speed;

means independent of the gear selecting mechanism for determining one of the first and second gear positions utilizing a mathematical operation involving the sensed engine speed N, the sensed vehicle speed V, and the first reference level; and means responsive to a determination of the first gear position by the determining means for shifting the first reference level to a second reference level defined by a second predetermined ratio value of the engine speed and vehicle speed, the determining means being responsive to the means for shifting for determining one of the first and second gear positions utilizing a mathematical operation involving the sensed engine speed N, the sensed vehicle speed V, and the second reference level.

According to another aspect of the invention, an apparatus for detecting the gear position of a transmission system of a vehicle having an engine, a manually operable gear selection mechanism, and an accelerator pedal, comprising a microcomputer responsive to sensed vehicle condition for controlling a fuel injection system of the engine and for terminating the fuel supply to the engine when the transmission is in one of a first and second position, means for sensing the engine speed N;
means for sensing the vehicle speed V, the vehicle having a first charateristic N/V ratio corresponding to the first gear position of the transmission system and second N/V ratio corresponding to second gear position of the transmission system, the microcomputer including a central processing unit (CPU) and memory storage means for storing a control program for causing the microprocessor to generate a gear position indication signal by:

establishing a first reference level defined by a first predetermined ratio value of the engine speed and the vehicle speed;

determining, independently of the gear selection mechanism and the accelerator pedal, whether the transmission is in the first or second gear position utilizing a mathematical operation involving the sensed engine speed N, the sensed vehicle speed V, and the first reference level;

shifting the first reference level to a second reference level defined by a second predetermined ratio value of the engine speed and the vehicle speed responsive to a determination of the first gear position by the determining means; and determining one of the first and second gear positions utilizing a mathematical operation involving the sensed engine speed N, the sensed vehicle speed V, and the second reference level, According to still another aspect of the invention, there is disclosed a method for detecting the gear position of a transmission system of a vehicle having an engine, a manually operable gear selection mechanism an accelerator pedal comprising the steps of:

sensing the engine speed N;
sensing the vehicle speed V, said vehicle having a first charateristic N/V ratio corresponding to a first gear position of said transmission system and second characteristic N/V ratio corresponding to second gear position of said transmission system;

establishing a first reference level defined by a first predetermined ratio value of the engine speed and the vehicle speed;

determining independently of the position of the gear selection mechanism and the accelerator pedal, whether the transmission is in the first or second gear position utilizing a mathematical operation involving the sensed engine speed N, the sensed vehicle speed V, and the first reference level;

shifting the first reference level to a second reference level defined by a second predetermined ratio value of the engine speed and the vehicle speed in response to a determination of said first gear position; and determining one of said first and second gear position utilizing a mathematical operation involving the sensed engine speed N, the sensed vehicle speed V, and the second reference level.

According to still another aspect of the invention, there is disclosed a method for detecting the gear position of a transmission system of a vehicle having an engine, a manually operable gear selection mechanism, an accelerator pedal and a microcomputer responsive to sensed vehicle conditions for controlling a fuel injection system of the engine and for terminating supply of fuel to the engine only when the transmission is in one of a first and second gear comprising the steps of:

sensing the engine speed N;

sensing the vehicle speed V, the vehicle having a first characteristic N/V ratio corresponding to the first gear position of the transmission system and a second characteristic N/V ratio corresponding to the second gear position of the transmission system, the microcomputer including a control processing unit (CPU) and memory storage means for storing a control program for causing the microprocessor to generate a shift position indication signal by:

establishing a first reference level defined by a first predetermined ratio value of the engine speed and the vehicle speed;

determining, independently of the position of the gear select mechanism and the accelerator pedal whether the transmission is in the first or second gear position by utilizing a mathematical operation involving the sensed engine speed N, the sensed vehicle speed V, and the first reference level;

shifting the first reference level to a second reference level defined by a second predetermined ratio value of the engine speed and the vehicle speed responsive to a determination of the first gear position; and determining one of the first and second gear positions utilizing a mathematical operation involving the sensed engine speed N, the sensed vehicle speed V, and the second reference level.

DETAILED DESCRIPTION OF THE PREFERRED EMBODIMENTS

Before entering into the description of the present invention, the drawbacks inherent to the prior art gear position detecting system will be explained with reference to FIG. 1 of the accompanying drawings.

Figure 1:
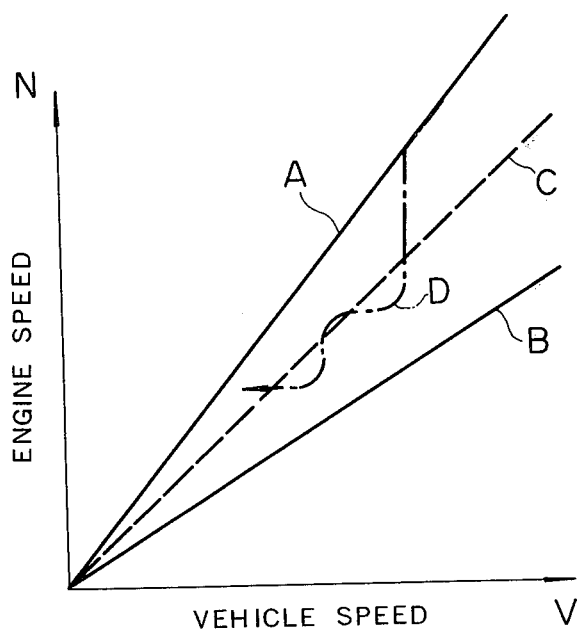
FIG. 1 is a graph showing a relationship between the sensed vehicle speed and the reference value of a prior art gear position detecting system.

FIG. 1 illustrates actual N/V lines for the top gear position and third gear position of a transmission, the solid line A indicating the variation in N/V when the N/V is (50 $G_0/3\pi r$) (i.e., when third gear is selected) and the solid line B indicating the variation in N/V when the N/V ratio is (25 $G_0/3\pi r$) (i.e., when the top gear is selected). The broken line C shows that the reference level k having a value of (75 $G_0/6\pi r$). The dotted line D indicates the variations in N/V which occur when the vehicle decelerates abruptly.

As above mentioned, determination of the gear position is executed by comparing the engine speed and the vehicle speed ratio N/V with the reference level k. The system determines that the top gear position is less when the ratio N/V is greater than the reference level k and determines that the third gear position is selected when the ratio N/V is greater than the reference level k.

However, due to fact that a microcomputer typically operates on a time sharing basis, engine speed data is typically read more frequently than vehicle speed data. Therefore, the N/V ratio utilized for determine the gear position does not in fact follow the actual N/V value shown as the solid line A of FIG. 1.

This tendency is increased as the rate of change in the vehicle speed increases and the N/V ratio varies across the dotted line D in FIG. 1, for example, when the vehicle decelerates abruptly.

As will be understood from the foregoing, when the dotted line D drops below line C, the system erroneously determines that the top gear is momentarily selected because the N/V ratio used for the computation is smaller than the reference level k.

Such an erroneous determination of the gear position results in an undesirable fuel cut off control of the engine, which imparts a shock or impact to the passenger(s) of the vehicle.

Figure 2:
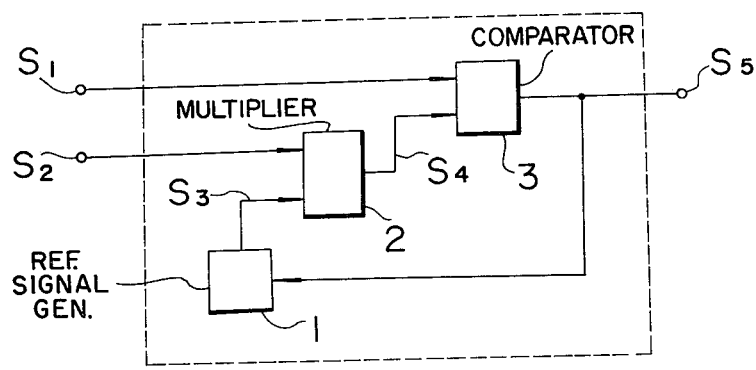
FIG. 2 is a block diagram of a first embodiment of the apparatus for detecting the gear position of the transmission system according to the present invention.

Reference is now made to FIG. 2, a first embodiment according to the present invention is illustrated.

As shown in FIG. 2, the apparatus comprises a reference signal generator circuit 1, a multiplier 2, and a comparator 3 for producing a gear position determination signal $S_5$. $S_1$ denotes a signal indicative of the engine speed, which may preferably be determined by the period or the frequency of the pulse signal which is produced at a predetermined engine crankshaft angle. $S_2$ denotes a signal indicative of the vehicle speed and corresponds to the rotational speed of the output shaft of the transmission system (generally, detected by the rotational speed of the speed meter cable).

In addition, any signal responsive to the rotational speed sensed after the speed conversion of the transmission system is available as signal $S_2$. For example, the rotational speed of a wheel of the vehicle or the output signal of a vehicle road speed detecting means including a radar system may be used.

The reference signal generator circuit 1 receives a determination signal $S_5$ from the comparator 3 and produces a reference signal $S_3$ which has two levels associated with the corresponding to two gear positions of the transmission. Specifically, the reference signal $S_3$ has the value of (85 $G_0/6\pi r$) when the determination signal $S_5$ has the logic "1" value (when the top gear is selected), and it has the value of (65 $G_0/6\pi r$) when the determination signal $S_5$ has the logic "0" value (when the third gear is selected). The reference signal $S_3$ is shifted to a side adjacent to the N/V ratio of the non-selected gear position. The output signal of the reference signal generator circuit 1 is applied to the multiplier 2.

The multiplier 2 produces a comparison signal $S_4$ having value $$K = V \frac{85 \, G_0}{6\pi r}$$

which is determined by multiplying the vehicle speed signal V with the reference signal $S_3$ having a value of either (85 $G_0/6\pi r$) or (65 $G_0/6\pi r$).

The comparison signal $S_4$ and the engine speed signal $S_1$ are fed to the comparator 3 and the comparator 3 produces the determination signal $S_5$ having a logic "1" or "0" in response to the comparison result of the engine signal $S_1$ with the comparison signal $S_4$. The determination signal $S_5$ has the logic "1" value when the value of the engine speed signal $S_1$ is greater than the comparison signal $S_4$, and the logic "0" value when the engine speed signal $S_1$ is smaller than the reference signal $S_4$.

If determination signal $S_5$ has the logic value "1", it indicates that the top gear is engaged, and if it has the logic value "0", it indicates that third gear is engaged.

The determination signal $S_5$, thus produced, is used for controlling the fuel system of the internal combustion engine.

Figure 4:
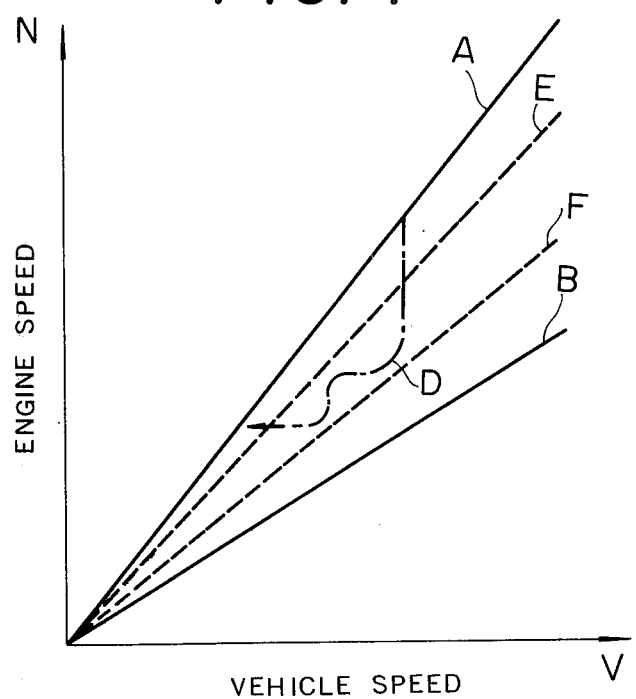
FIG. 4 is a graph showing a relationship between the sensed vehicle speed and the reference level values of the gear position detecting system according to the present invention.

The operation of the apparatus shown in FIG. 2 under various engine speed and vehicle speed condition is shown in FIG. 4.

In FIG. 4, the broken line E represents the reference N/V having a value of (85 $G_0/6\pi r$). Similarly, the broken line F represents the reference N/V having a value of (65 $G_0/6\pi r$).

As mentioned above, if the determination signal $S_5$ has logic "1", in other words, when the top gear position is selected (shown by the solid line B), the system selects the reference level shown by the line E, and conversely, when the determination signal has logic "0" value, i.e., when the third gear position is selected, (shown by the solid line A), the system selects the reference level shown by the broken line F.

Since the determination of the gear position is obtained as a result of a comparison of the sensed engine speed with the selected comparison signal $S_4$ is shifted to a side away from the N/V ratio of the detected gear position, any posibility that the system will erroneously determine the wrong gear position is eliminated.

Figure 3:
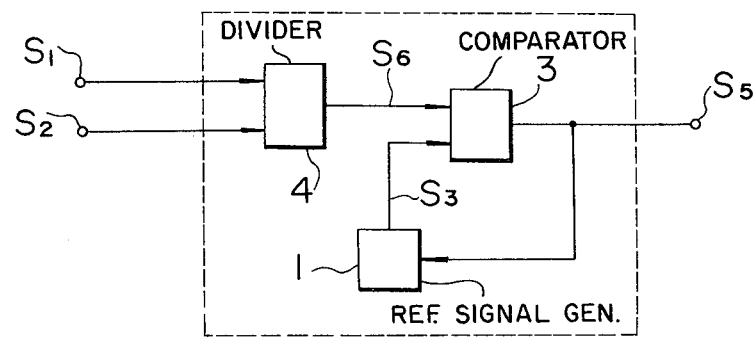
FIG. 3 is a block diagram of a second embodiment according to the present invention.

FIG. 3 illustrates a second embodiment according to the present invention. In embodiment, a divider circuit 4 is provided in place of the multiplier 2 of FIG. 2 for producing a ratio of $S_1/S_2$, i.e., is N/V. This N/V ratio compared with the reference signal $S_3$ by a comparator 3. This circuit construction provides the same functions as the first embodiment illustrated in FIG. 2.

It will be appreciated that the operation of the apparatus illustrated in FIGS. 2 and 3 is preferably executed by a computation steps in a microcomputer system.

Figure 5:
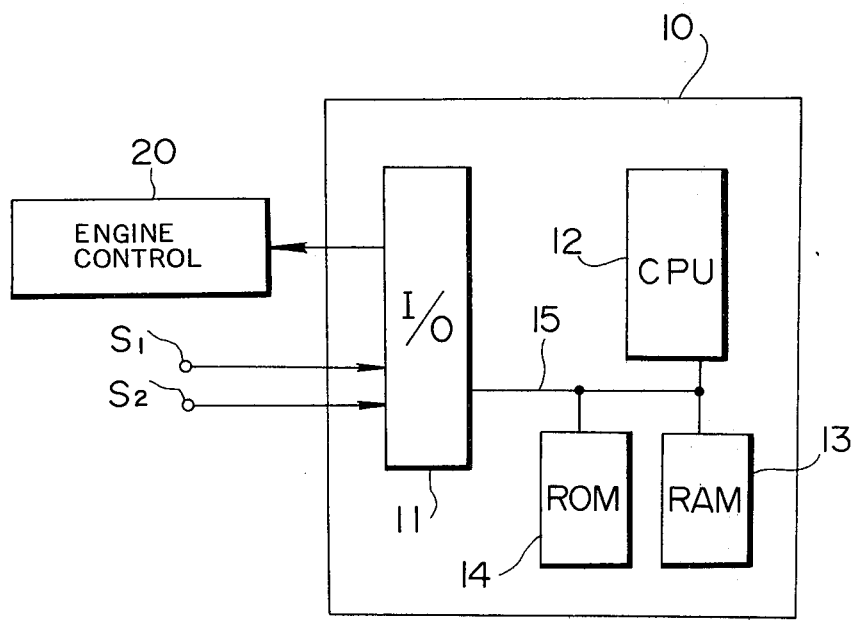
FIG. 5 is a block diagram of a third embodiment according to the present invention wherein a microcomputer system is used for determining the gear position.

FIG. 5 shows a third embodiment according to the present invention wherein a microcomputer based system is used for the determination of the gear position.

In FIG. 5, a microcomputer based system 10 includes an input/output interface circuit (I/O) 11, a central processor unit (CPU) 12, a random access memory (RAM) 13, and a read only memory (ROM) 14. These units are interconnected via bus lines 16. The engine speed data $S_1$ and the vehicle speed data $S_2$ are input to the microcomputer system 10 via the input/output interface circuit 11. the determination of the gear position is executed in accordance with a program stored in ROM, and the result of the determination is outputted, for example, to an engine control device 20 via the input/output interface circuit 11.

Figure 6:
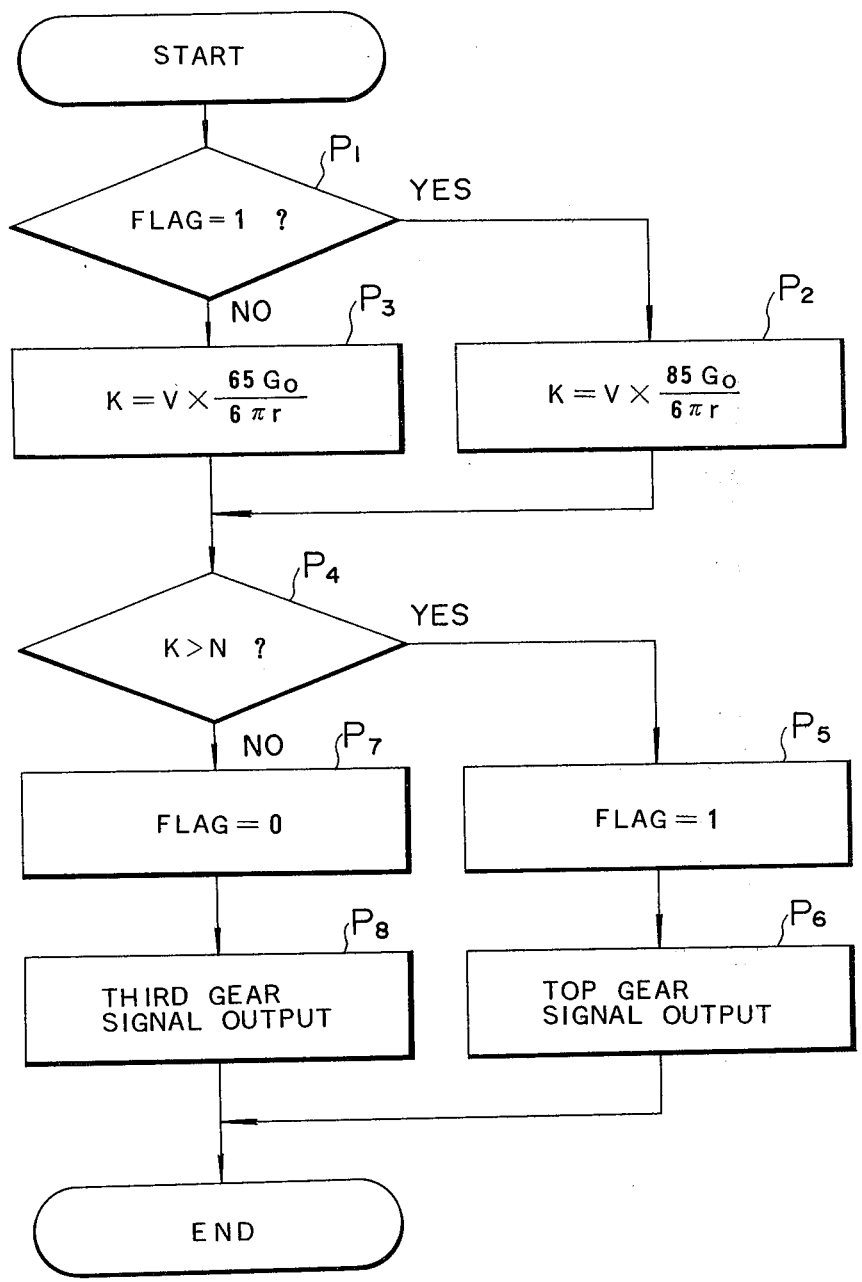
FIG. 6 is a flowchart of a computation process executed in a microcomputer based control system in accordance with the present invention.

When the microcomputer based system is employed, the computation is executed as shown in FIG. 6.

In effect, the computation shown in FIG. 6 is repeated at predetermined intervals or in synchronism with the engine rotation.

In step $P_1$, it is determined if a flag of logic value "1" was set during the previous cycle of calculation. Initially, the flag may be set to either "1" or "0".

If the answer is YES, it shows that the top gear was selected during the previous detection sequence. value of $$K = V \frac{85 \, G_0}{6 \pi r}$$

(the characteristic E of FIG. 4) is set at step $P_2$.

If the answer in the step $P_1$ is NO, it indicates that top gear was not selected during the previous sequence. Therefore, the value of $$K = V \frac{65 \, G_0}{6 \pi r}$$

(the characteristic F of FIG. 4) is set at step $P_3$.

At step $P_4$, the reference value k determined by comparing the value of K from step $P_2$ or $P_3$ with the engine speed N.

If the answer is YES in step $P_4$, it means that the value of N is smaller than the reference level K, in other words, that the top gear is engaged. In this state, the FLAG having the value "1" is set in step $P_5$ and a top gear determination signal is produced at step $P_6$.

If the answer is NO at step $P_4$, it means that the N value is larger than the reference level, and that a gear position other than top gear (for example, third gear) is engaged. Then the FLAG is set to a logic value "0" in step $P_7$; and a determination signal indicating that the transmission is in a down gear, (for example, third gear) is outputted in step $P_8$.

In addition, if the above sequence is modified to effect the calculation of FIG. 3, the calculation is executed so that the value $k = (85 \, G_0/6\pi r)$ is set in step $P_2$, and the value $k = (65 \, G_0/6\pi r)$ in step $P_3$, and whether or not k is larger than $N/V$ is determined in step $P_4$.

What is claimed is:

1. An apparatus for detecting the gear position of a transmission system having a manually operable gear selection mechanism in a vehicle having an engine controlled by an accelerator pedal, comprising:
    (a) means for sensing the engine speed N;
    (b) means for sensing the vehicle speed V;
    said vehicle having a first characteristic N/V ratio corresponding to a first gear position of said transmission system and second characteristic N/V ratio corresponding to second gear position of said transmission system;
    (c) reference level establishing means for establishing a first reference level defined by a first predetermined ratio of engine speed to vehicle speed;
    (d) means, independent of said manually operable gear selection mechanism and accelerator pedal, for determining which of said first and second gear positions said transmission is in utilizing a mathematic operation involving the sensed engine speed N, the sensed vehicle speed V, and the first reference level; and
    (e) means, responsive to a determination of said first gear position by said determining means, for shifting the first reference level to a second reference level defined by a second predetermined ratio of engine speed to vehicle speed,
    said determining means being responsive to said shifting means for determining which of said first or second gear positions said transmission is in utilizing a mathematical operation involving the sensed engine speed N, the sensed vehicle speed V, and the second reference level.

2. An apparatus as claimed in claim 1, wherein said second reference level is defined by a second predetermined ratio which is closer to the N/V ratio corresponding to said second gear position than is said first reference level.

3. An apparatus as claimed in claim 2, wherein said determining means comprises a multiplier circuit responsive to output signals from said means for sensing the engine speed and said reference level establishing means for producing a comparison signal, and a comparator for producing a gear position indication signal by comparing the output signals of said means for sensing the engine speed and said multiplier circuit.

4. An apparatus as claimed in claim 2, wherein said determination means comprises a divider circuit, responsive to output signals from said means for sensing the engine speed and means for sensing the vehicle speed for producing a N/V ratio, and a comparator for producing a gear position indication signal by comparing said N/V ratio and a reference level from said reference level establishing means.

5. An apparatus for detecting the gear position of a transmission system having a manually operable gear selection mechanism in a vehicle having an engine controlled by an accelerator pedal, comprising:
    a microcomputer responsive to sensed vehicle conditions for controlling a fuel injection system of said engine and for interrupting fuel supply to said engine only when said transmission is in a given one of a first and a second gear position;
    means for sensing the engine speed N;
    means for sensing the vehicle speed V;
    said vehicle having a first characteristic N/V ratio corresponding to said first gear position of said transmission system and a second characteristic N/V ratio corresponding to said second gear position of said transmission system, said microcomputer including a central processing unit (CPU) and memory storage means for storing a control program for causing said microcomputer to generate a gear position indication signal by:
  (i) establishing a first reference level defined by a first predetermined ratio of engine speed to vehicle speed;
  (ii) determining, independently of said manually operable gear selection mechanism and said accelerator pedal, whether the transmission is in said first or second gear position by utilizing a mathematical operation involving the sensed engine speed N, the sensed vehicle speed V, and the first reference level;
  (iii) shifting the first reference level to a second reference level defined by a second predetermined ratio of engine speed to vehicle speed responsive to a determination by said determining means that the transmission is in said first gear position; and
  (iv) determining which of said first and second gear positions said transmission system is in utilizing a mathematical operation involving the sensed engine speed N, the sensed vehicle speed V, and the second reference level.

6. An apparatus as claimed in claim 5, wherein said second reference level is defined by a second predetermined ratio which is closer to the N/V ratio corresponding to said second gear position than is said first reference level.

7. A method for detecting the gear position of a transmission system having a manually operable gear selection mechanism in a vehicle having an engine controlled by an accelerator pedal, comprising the steps of:
  (a) sensing the engine speed N;
  (b) sensing the vehicle speed V,
  said vehicle having a first characteristic N/V ratio corresponding to a first gear position of said transmission system and second characteristic N/V ratio corresponding to second gear position of said transmission system;
  (c) establishing a first reference level defined by a first predetermined ratio of engine speed to vehicle speed;
  (d) determining, independently of said manually operable gear selection mechanism and said accelerator pedal, whether the transmission is in said first or said second gear position by utilizing a mathematical operation involving the sensed engine speed N, the sensed vehicle speed V, and the first reference level;
  (e) shifting the first reference level to a second reference level defined by a second predetermined ratio of engine speed to vehicle speed in response to a determination that the transmission is in said first gear position; and
  (f) determining which of said first and second gear positions said transmission system is in utilizing a mathematical operation involving the sensed engine speed N, the sensed vehicle speed V, and the second reference level.

8. A method as claimed in claim 7, wherein said second reference level is defined by a second predetermined ratio which is closer to the N/V ratio corresponding to said second gear position than is said first reference level.

9. A method for detecting the gear position of a transmission system having a manually operable gear selection mechanism in a vehicle having an engine controlled by an accelerator pedal and a microcomputer responsive to sensed vehicle conditions for controlling a fuel injection system of said engine and for interrupting fuel to said engine when said transmission is in a given one of a first and a second gear position, comprising the steps of:
  (a) sensing the engine speed N;
  (b) sensing the vehicle speed V, said vehicle having a first characteristic N/V ratio corresponding to a first gear position of said transmission system and a second characteristic N/V ratio corresponding to a second gear position of said transmission system;
  said microcomputer including a control processing unit (CPU) and memory storage means for storing a control program for causing said microcomputer to generate a shift position indication signal by:
  (i) establishing a first reference level defined by a first predetermined ratio of engine speed to vehicle speed;
  (ii) determining, independently of said manually operable gear select mechanism and said accelerator pedal, whether said transmission is in said first or second gear position by utilizing a mathematical operation involving the sensed engine speed N, the sensed vehicle speed V, and the first reference level;
  (iii) shifting the first reference level to a second reference level defined by a second predetermined ratio of engine speed to vehicle speed responsive to a determination that the transmission is in said first gear position; and
  (iv) determining which of said first and second gear positions said transmission is in utilizing a mathematical operation involving the sensed engine speed N, the sensed vehicle speed V, and the second reference level.

10. A method as claimed in claim 9, wherein said second reference level is defined by a second predetermined ratio which is closer to the N/V ratio corresponding to said second gear position than is said first reference level.

11. In a control system for an automotive vehicle having:
  a transmission including at least first and second gear ratios;
  an engine speed sensor for sensing engine speed and generating an engine speed signal (N);
  a vehicle speed sensor for sensing vehicle speed and generating a vehicle speed signal (V);
  an apparatus for determining the gear position of the transmission based only upon said engine speed signal and said vehicle speed signal, said apparatus comprising:
  a first circuit for selectively generating first and second reference signals, said first and second reference signals varying in accordance with first and second predetermined ratios of N/V respectively, said first predetermined ratio lying between ratios of N/V which correspond to said first and second gear ratios of said transmission and proximate a ratio of N/V which corresponds to said first gear ratio, said second predetermined ratio lying between said first predetermined ratio and a ratio of N/V which corresponds to said second gear ratio and proximate a ratio of N/V which corresponds to said second gear ratio; and a second circuit for receiving and mathematically processing said engine speed signal and said vehicle speed signal and the reference signal from said first circuit, and operable to compare the instantaneous value of N/V with the reference signal from said first circuit to produce a signal corresponding to one of said first and second gear ratios;

said first circuit being responsive to the output of said second circuit to generate said first reference signal when said second circuit produces a signal indicative of said second gear ratio, and to generate said second reference signal when said second circuit produces a signal indicative that the transmission is operating in said first gear ratio whereby an erroneous gear ratio indication by said second circuit is avoided even when the instantaneous value of N/V fluctuates due to transitional operation of the vehicle.

12. A control system as claimed in claim 11, wherein said second circuit comprises:

a comparator circuit, one input of which receives said engine speed signal, and a multiplier circuit interposed between said first circuit and said comparator circuit, said multiplier circuit having one input which receives a reference level from said first curcuit and another input which receives said vehicle speed signal, the output of said multiplier being connected to another input of said comparator.

13. A control system as claimed in claim 11, wherein said second circuit comprises:

a comparator circuit, one input of which receives a reference level from said first circuit, and a divider circuit which receives said vehicle speed signal and said engine speed signal and which outputs a signal indicative of the instantaneous value of N/V to another input of said comparator.

14. A control system according to claim 11, wherein said first and second circuits comprise a part of a microcomputer which further comprises a CPU, a RAM and a ROM.

15. A control system as claimed in claim 14, wherein said microcomputer controls a fuel injection system of said vehicle, said fuel injection system being operable to interrupt the supply of fuel to said engine based upon the output of said second circuit of said microcomputer.

16. A control system as claimed in claim 15, wherein said second gear ratio is higher than said first gear ratio and wherein said microcomputer interrupts fuel to said engine only when said second circuit indicates that the transmission is in said second gear ratio.

* * * * *